Figure 1:
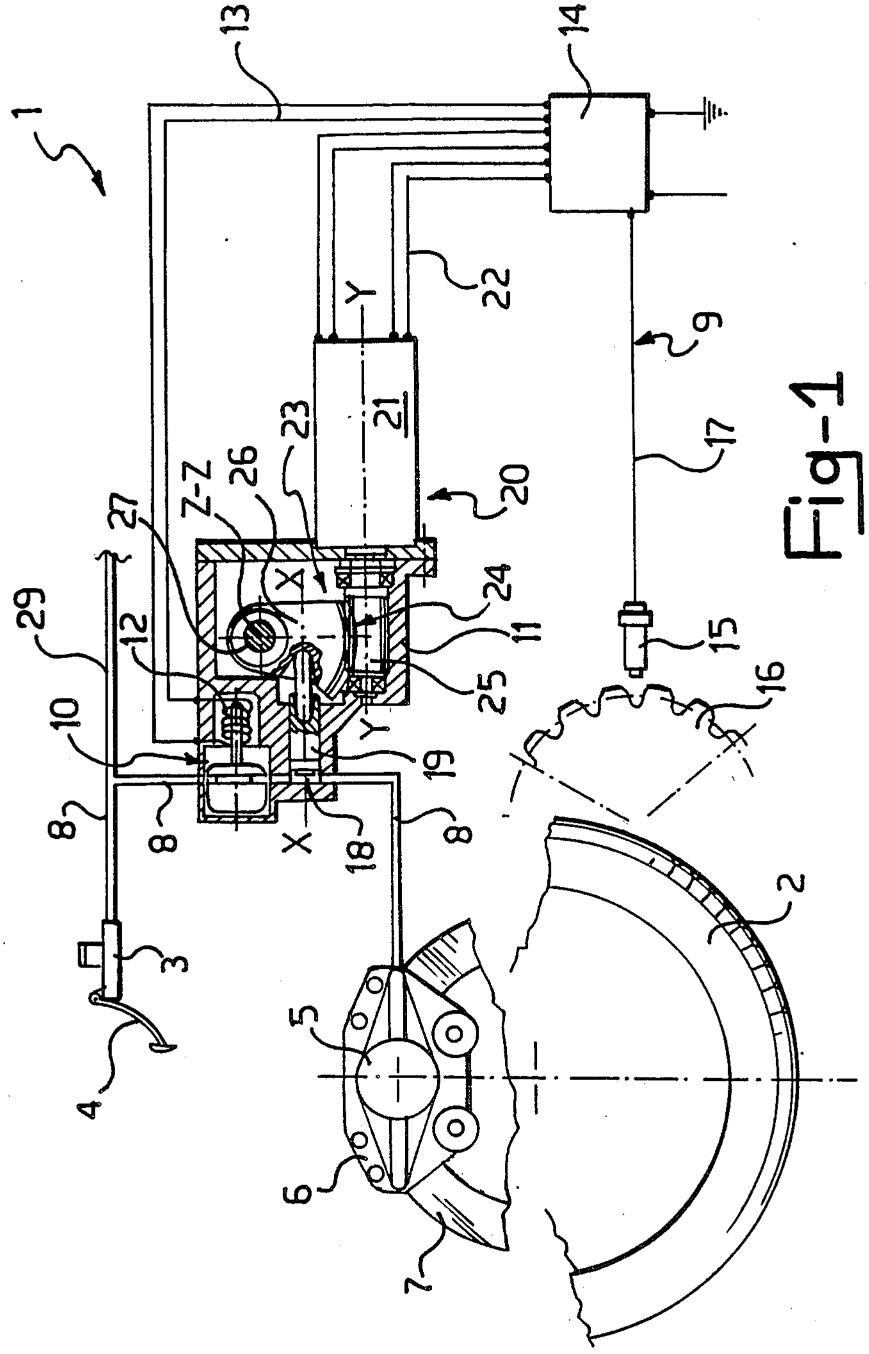

United States Patent [19]

Giorgetti et al.

[11] Patent Number: 4,886,323

[45] Date of Patent: Dec. 12, 1989

[54] ANTISKID DEVICE USEFUL IN A BRAKE SYSTEM OF A MOTORVEHICLE

[75] Inventors: Alberto Giorgetti, Terno d'Isola; Roberto Lavezzi, Brembate Sopra, both of Italy

[73] Assignee: Brembo S.p.A., Paladina, Italy

[21] Appl. No.: 164,566

[22] Filed: Mar. 7, 1988

[30] Foreign Application Priority Data

Mar. 9, 1987 [IT] Italy ............................ 19629 A/87

[51] Int. Cl.[4] ............................................ B60T 8/42

[52] U.S. Cl. ............................ 303/113; 188/181 A

[58] Field of Search ...................... 188/181 A, 181 R; 303/61, 113, 117, 119

[56] References Cited

U.S. PATENT DOCUMENTS

| | | | |
|---|---|---|---|
| 2,868,338 | 1/1959 | Lucien et al. | 188/181 A |
| 3,549,210 | 12/1970 | Birge et al. | 303/61 X |
| 3,731,979 | 5/1973 | Mikaila | 303/61 X |

FOREIGN PATENT DOCUMENTS

| | | | |
|---|---|---|---|
| 0223358 | 5/1987 | European Pat. Off. . | |
| 3441380 | 5/1986 | Fed. Rep. of Germany | 303/119 |
| 1425674 | 2/1976 | United Kingdom . | |
| 2188111 | 9/1987 | United Kingdom . | |
| 2188113 | 9/1987 | United Kingdom . | |

*Primary Examiner*—Duane A. Reger

*Attorney, Agent, or Firm*—Hedman, Gibson, Costigan & Hoare

[57] ABSTRACT

An antiskid device for a brake system of a motorvehicle and the like, effective to prevent jamming of a wheel and at the same time ensure a braking action thereof which is consistently the equal of the best possible relatively to the road surface, comprises an on-off valve placed in a line conducting the braking fluid from a master cylinder to a braking cylinder of said system, a wheel deceleration sensor effective to generate a wheel skidding signal continuously, a surge chamber put into communication with said line downstream of said on-off valve a piston movable within said surge chamber, and a control means for said piston driven continuously by said wheel skidding signal.

2 Claims, 2 Drawing Sheets

ANTISKID DEVICE USEFUL IN A BRAKE SYSTEM OF A MOTORVEHICLE

This invention relates to an antiskid device useful in a brake system of a motorvehicle and the like, being effective to prevent jamming of a vehicle wheel and of a type which comprises an on-off valve placed in a line conducting the braking fluid from a master cylinder to a braking cylinder of said system, and a wheel deceleration sensor adapted to generate a wheel skidding signal.

It is a well-known fact that during brake application, a wheel, most likely a rear wheel of the vehicle, may lose its grip on the road surface and become jammed, thereby skidding occurs.

Also known is that jamming of either or, which is even worse, both rear wheels is apt to impair a motorvehicle running stability and cause it to side skid, eventually into a spin-out situation.

In general, on an ordinary road wearing course, this would be the outcome, for example, of a panicky brake application, as the brake pedal is stepped on abruptly without restraint.

However, rear wheel jamming may also occur, during brake application, as a vehicle suddenly comes across a slippery portion of the road surface, such as an ice formation.

There exists a need, therefore, to ensure the tractive power of the rear wheels of a motorvehicle even in such situations as those outlined above, so as to prevent jamming of the wheels and eventual side skidding of the motorvehicle.

To meet this requirement, an antiskid device has been proposed which comprises a check valve placed in the line which conducts the braking fluid from the master cylinder to the braking cylinder and operative to stop the fluid flow from the master cylinder to the brake cylinder.

The check valve has a shutter which is normally held in the open position by a plunger located downstream of the shutter and biased constantly toward the shutter by a powerful spring, and adapted to be moved in the opposite direction against the bias force of said spring by the action of an oil under pressure, in particular the action of the oil from an appropriately separated hydraulic circuit independent of the braking circuit. A wheel deceleration os wheel speed sensor is arranged to sense an impending wheel skidding condition and move back the plunger to shut off the line and relieve the pressure in the line section downstream of the shutter and, hence, in the braking cylinder.

This prior approach is widely used and serves substantially its purpose in that it can prevent wheel jamming and side skidding of the vehicle. However, it has the drawback that it involves the special provision of a complete hydraulic circuit, which is evidently disadvantageous in terms of space requirements, costs, and complexity of construction. A further drawback of said approach is that it brings about a drop, albeit a slight one, in the braking pressure throughout the system during the transition phase when the shutter is closed.

An antiskid device has been also proposed which comprises an on-off valve in the line conducting the braking fluid from the master cylinder to the braking cylinder, and a surge chamber wherein a piston is operative which is subjected to the action of a relatively weak spring. The surge chamber is parallel connected in said line, downstream of the valve, and is in turn normally shut off by a respective valve. A wheel speed sensor senses the moment that the wheel begins to skid and controls said valves to shut off the line and communicate its downstream branch with the surge chamber. Thus, the pressure in the braking cylinder will drop to a value corresponding to the spring force and the wheel, which is virtually no longer braked, is brought back to its tractive state. On restoring traction, the original condition is reinstated and the braking action resumed, at least until the master cylinder reaches its bottom travel limit.

This prior approach, while being advantageous for various aspects, still has the disadvantage of progressively approaching a condition whereby the braking action is brought to nil.

The problem underlying this invention is to provide an antiskid device which has such constructional and operative features as to meet the above-noted requisite, while overcoming the drawbacks noted above in connection with the state of the art.

This problem is solved by a device as indicated being characterized in that it comprises a chamber put into communication with said line downstream of said on-off valve, a piston movable within said chamber, and a control means for said piston driven continuously by said wheel skidding signal.

Figure 2:
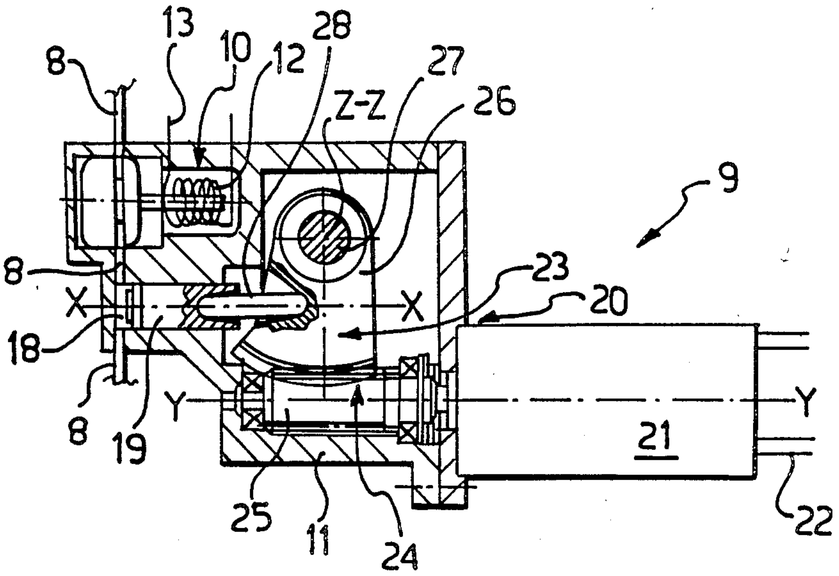
Figure 3:
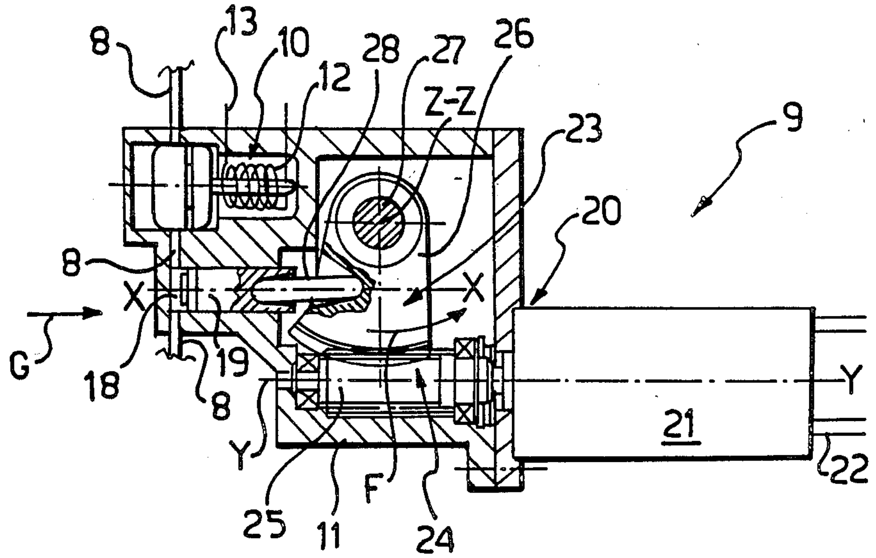

Further features and the advantages of the antiskid device of this invention will be more clearly understood from the following detailed description of an embodiment thereof, to be taken by way of example and not of limitation in conjunction with the accompanying drawings, where:

FIG. 1 is a part-sectional view showing diagramatically a brake system of a motorvehicle incorporating an antiskid device according to the invention; and FIGS. 2 and 3 are part-sectional views showing diagramatically the antiskid device of FIG. 1 at two different stages of its operation.

With reference to the drawing figures, the numeral 1 generally designates a brake system of a motorvehicle for braking a wheel 2, such as a rear wheel, thereof.

The system 1 comprises a master cylinder 3 operable through a respective brake pedal 4, and a braking cylinder 5 mounted to a brake caliper 6 and acting on a brake disk 7 associated with the wheel 2.

The numeral 8 designates a line for conducting oil under pressure from the master cylinder 3 to the braking cylinder 5 and apply the wheel 2 brake.

The system 1 further includes an antiskid device 9 effective to prevent jamming of the wheel 2 on a panic application of the brake or while driving over a slippery road portion.

The device 9 comprises an on-off valve 10 provided in the line 8 to shut it off. The on-off valve 10 is a two-way, two-setting solenoid valve of conventional design and mounted in a holder body 11 attached to the motorvehicle. The solenoid valve 10 is normally open and is driven to its closed position, i.e. the position where it will shut off the line 8, by energizing its coil 12 via wire cables 13 from a control unit 14.

The device 9 also comprises a sensor 15, which is arranged to face a phonic wheel 16, known per se, made rigid with the wheel 2, e.g. keyed to an axle shaft, for rotation therewith. The sensor 15 is connected by wire cables 17 to the control unit 14 and detects the deceleration of the phonic wheel 16, and hence of the wheel 2, continuously, to continuously generate a wheel 2 skidding signal, to be supplied to the control unit 14 in a manner known per se, following comparison to a reference deceleration corresponding to a threshold value preset in the control unit, that is corresponding to the motorvehicle deceleration as readily computed on the basis of the vehicle travel speed to be picked up, for example, from the speedometer.

The antiskid device 9 of this invention includes a cylindrical chamber 18 about an axis X—X, which is formed in the holder body 11 and put in fluid communication with the line 8, downstream of the solenoid valve 10. In other words, the 1 chamber 18 is provided in that portion of the line 8 which extends from the solenoid valve 10 to the braking cylinder 5.

Movable within the chamber 18 in sealed relationship therewith along the direction X—X, is a piston 19, which linked operatively to a control means 20 driven by the aforesaid wheel 2 skidding signal and is mounted on the holder body 11.

The control means 20 comprises an electric motor 21 and a drive 23 extending between the motor 21 and the piston 19.

The electric motor 21 has an axis Y—Y lying parallel to the axis X—X, and is of a type known per se and connected to a control unit 14 by means of wire cables 22.

The drive 23 comprises an irreversible pair 24 consisting of a worm-gear segment pair formed of a worm 25 having an axis Y—Y and driven by the electric motor 21, to the shaft whereof the worm would be keyed, and of a gear segment 26.

The gear segment 26 has one end pivoted to a pivot pin 27 having an axis Z—Z perpendicular to the axes X—X and Y—Y, and an opposite end in mesh engagement with the worm 25, and is arranged to act, at a median point thereof, on the piston 19 via a strut 28.

A line 29, branching off the line 8, is provided to conduct braking fluid to another rear wheel, not shown. In the line 29 there would be advantageously provided a respective antiskid device identical with the one just described.

It should be further noted that similar antiskid devices may be provided in the braking fluid lines leading to the vehicle front wheels.

The operation of this antiskid device will be described herein below with reference to a starting condition as shown in FIGS. 1 and 2, whereby the brake system is in a normal condition of brake application and within the line 8 and the chamber 18 a set pressure prevails. In that condition, the sensor 15 will sense a deceleration of the wheel 2 which is of smaller magnitude than the reference deceleration, thereby the wheel skidding signal is null.

When driving over an ice formation, whereby the wheel is apt to undergo a higher deceleration due to impending wheel jamming, the sensor will sense this deceleration and cause a wheel skidding signal to be generated at the control unit to first energize the solenoid valve 10, and move it to its shut-off position (see FIG. 3), and then operate the electric motor 21 such that the gear segment 26 is moved angularly in the direction of the arrow F and the piston 19 moved in the direction G.

Accordingly, there will occur a decrease of the pressure within the chamber 18, and hence within the line 8 and eventually within the braking cylinder 5; this attenuates the braking action on the vehicle wheel and restores its traction on the road surface. In this condition, the skidding signal will return to zero, and the electric motor is then supplied a command to reverse its direction of rotation, thereby the pressure in the line is again increased and the braking action re-applied. Where now a situation is encountered whereby the vehicle wheel is again on the point of jamming, the skidding signal, as continuously processed at the control unit 14, would drive the motor to rotate, and again lower the pressure, thereby ensuring that the wheel traction is maintained.

The same considerations would apply to a condition of panic brake application. On the skidding signal causing the solenoid valve 10 to be energized, the motor 21 would be operated through its cycle to first nullify said signal and then restore the braking action cyclically. This ensures that the wheel traction is maintained at its best compatibly with the road surface. This may be repeated until the motorvehicle is brought to a full stop.

The main advantage of the antiskid device according to this invention resides in the simplicity and reliability of its construction and operation, and its ability to provide a braking action which is consistently equal to the best possible action relatively to the road surface until the vehicle is brought to a stop.

It should be noted that where the inventive device is incorporated to all the wheels, including the front ones, not only optimum road-holding features can be attained but also optimum steering characteristics.

Note is to be also taken of that the device of this invention is also inherently safe. In fact, any malfunctions putting the electric motor or the control unit out of operation would not reflect in the pressure within the brake line being lost undesirably; this because the irreversible drive pair would function in such conditions as a positive mechanical stop for the piston, effectively holding it at the position which it occupies at the time.

It is understood that the device of the exemplary embodiment described hereinabove may be modified and altered in many ways by a skilled person in the art, in order to met specific and contingent requirements, without departing from the protection scope of the invention as set forth in the appended claims.

I claim:

1. An antiskid device in a braking system having a master cylinder, a braking cylinder, a line connected to the cylinders for conveying braking fluid therebetween, an on-off valve in the line which isolates the braking cylinder from the master cylinder when the valve is actuated to its on position, comprising:

(a) a chamber in communication with the line, downstream of the on-off valve, and having a moveable piston therein;

(b) an electric motor connected to said piston by an irreversible linkage pair wherein said pair transmits only the movement of the motor to the piston;

(c) a control means operatively connected to said motor for controlling the movement of said motor in response to skidding; and (d) a sensing means operatively connected to said control means for generating and transmitting a signal to said control means in response to skidding.

2. An antiskid device according to claim 1, wherein said irreversible pair includes a worm and gear segment pair, and wherein said worm is driven by said electric motor and said gear segment is arranged to act on the piston.

* * * * *